United States Patent
Beck

(10) Patent No.: US 11,773,967 B2
(45) Date of Patent: Oct. 3, 2023

(54) METHOD AND TRANSMISSION CONTROL APPARATUS FOR OPERATING A MULTIPLE-SPEED VEHICLE TRANSMISSION

(71) Applicant: ZF Friedrichshafen AG, Friedrichshafen (DE)

(72) Inventor: Ralf Beck, Oberteuringen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/930,516

(22) Filed: Sep. 8, 2022

(65) Prior Publication Data
US 2023/0184329 A1    Jun. 15, 2023

(30) Foreign Application Priority Data
Dec. 15, 2021  (DE) ...................... 10 2021 214 373.3

(51) Int. Cl.
*F16H 59/72*  (2006.01)
*F16H 61/20*  (2006.01)
(Continued)

(52) U.S. Cl.
CPC ............. *F16H 61/20* (2013.01); *F16H 59/52* (2013.01); *F16H 59/66* (2013.01); *F16H 59/72* (2013.01);
(Continued)

(58) Field of Classification Search
CPC .......... F16H 61/20; F16H 59/52; F16H 59/66; F16H 59/72; F16H 61/16;
(Continued)

(56) References Cited

U.S. PATENT DOCUMENTS 5,944,632 A * 8/1999 Hara ................... F16H 61/0031
477/158
6,776,272 B2   8/2004 Granderath
(Continued)

FOREIGN PATENT DOCUMENTS

CN    108639041 A  * 10/2018  ............ B60W 10/06
DE    10209514 A1 * 10/2002  ............... B60K 6/36
(Continued)

OTHER PUBLICATIONS

German Patent Office, Office Action issued in German patent application No. 10 2021 214 376.8 (dated Jul. 8, 2022).
(Continued)

*Primary Examiner* — Justin Holmes
(74) *Attorney, Agent, or Firm* — FINCH & MALONEY, PLLC

(57) ABSTRACT

A method is disclosed for operating a multi-gear vehicle transmission in a motor vehicle during a coasting phase. The coasting phase includes an overrun phase with a driving gear engaged and a freewheeling phase with the neutral gear engaged. It is determined whether the motor vehicle is in the overrun phase of the coasting phase, whether a condition for a transition to the freewheeling phase of the coasting phase is fulfilled, and whether a transmission condition with elevated drag losses exists. If the motor vehicle is in the overrun phase of the coasting phase, if the condition for transition to the freewheeling phase is fulfilled, and if a transmission condition with elevated drag losses exists, then at least one further shifting element (D, E) is closed in addition to the shifting elements (A, B, C) of the driving gear, which are closed during the overrun phase of the motor vehicle.

10 Claims, 2 Drawing Sheets

(51) Int. Cl.
*F16H 59/52* (2006.01)
*F16H 59/66* (2006.01)
*F16H 61/16* (2006.01)
*F16H 59/68* (2006.01)

(52) U.S. Cl.
CPC ..... *F16H 61/16* (2013.01); *F16H 2059/6823* (2013.01); *F16H 2200/006* (2013.01); *F16H 2200/0052* (2013.01); *F16H 2200/0082* (2013.01)

(58) Field of Classification Search
CPC ..... F16H 2059/6823; F16H 2200/0052; F16H 2200/006; F16H 2200/0082
See application file for complete search history.

(56) References Cited

U.S. PATENT DOCUMENTS

| | | | |
|---|---|---|---|
| 9,388,899 B2 * | 7/2016 | Schiele | ............ F16D 48/06 |
| 10,794,474 B1 | 10/2020 | Bielefeld | |
| 10,836,397 B1 | 11/2020 | Christensen et al. | |
| 2002/0173894 A1 | 11/2002 | Gorys et al. | |
| 2010/0044140 A1 | 2/2010 | Shultz et al. | |

FOREIGN PATENT DOCUMENTS

| | | | | |
|---|---|---|---|---|
| DE | 10 2009 002 108 A1 | 10/2010 | | |
| DE | 112008003336 T5 | * 10/2010 | ......... | F16H 61/0213 |
| DE | 10 2017 221 401 A1 | 5/2019 | | |
| DE | 10 2020 115 131 A1 | 12/2021 | | |

OTHER PUBLICATIONS

German Patent Office, Office Action issued in German patent application No. 10 2021 214 373.3 (dated Jul. 11, 2022).

German Patent Office, Office Action issued in German patent application No. 10 2021 214 377.6 (dated Jul. 8, 2022).

United States Patent and Trademark Office, Non-Final Office Action issued in U.S. Appl. No. 17/930,512 dated (Apr. 13, 2023).

* cited by examiner

| Gear | Brake | | Clutch | | |
|---|---|---|---|---|---|
| | A | B | C | D | E |
| 1 | ● | ● | ● | | |
| 2 | ● | ● | | | ● |
| 3 | | ● | ● | | ● |
| 4 | | ● | | ● | ● |
| 5 | | ● | ● | ● | |
| 6 | | | ● | ● | ● |
| 7 | ● | | ● | ● | |
| 8 | ● | | | ● | ● |
| R | ● | ● | | ● | |

METHOD AND TRANSMISSION CONTROL APPARATUS FOR OPERATING A MULTIPLE-SPEED VEHICLE TRANSMISSION

RELATED APPLICATIONS

The present application claims the benefit of and right of priority under 35 U.S.C. § 119 to German Patent Application no. 10 2021 214 373.3, filed on 15 Dec. 2021, the contents of which are incorporated herein by reference in its entirety

FIELD OF THE DISCLOSURE

The invention relates to a method for operating a multi-gear vehicle transmission. In addition, the invention relates to a transmission control unit designed to carry out the method, and to a corresponding computer program for implementing the method in the transmission control unit. Furthermore, the invention relates to a vehicle transmission and a motor vehicle with a vehicle transmission.

BACKGROUND

Multi-gear transmissions are known in automotive technology and are widely used. The gears, also called steps or gear ratios, produce various transmission ratios of the transmission between a transmission input and a transmission output. The gears can be selectively engaged. In that way, a torque delivered by a drive motor of the vehicle can be converted as a function of the situation. For example, in a starting gear a high gear ratio can be selected in order to accelerate the vehicle. In another, driving gear a lower gear ratio can be selected in order to maintain the speed of the vehicle with lower fuel consumption. The individual gears are engaged by means of shifting elements of the transmission.

In a neutral gear of the vehicle transmission, also called the idling gear, the transmission input and the transmission output are decoupled from one another. To engage the neutral gear a sufficiently large number of shifting elements of the transmission are opened. The engagement of the neutral gear can be called for by a driver of the vehicle, or automatically.

From the prior art a so-termed stand decoupling function is known. By virtue of the stand decoupling (NIC function: Neutral Idle Control), when the vehicle is at rest or almost so, the automatic opening of a shifting element of the vehicle transmission engages the neutral gear. Thereby the drivetrain is automatically interrupted and the transmission support torque is reduced so that the internal combustion engine can be operated with lower fuel consumption when the vehicle is at rest.

A method for controlling a stand decoupling function in a vehicle with an automatic transmission is known from DE 10 2009 002 108 A1.

SUMMARY

The purpose of the present invention is to provide a new type of method for operating a multi-gear vehicle transmission. In addition, a transmission control unit designed to carry out the said method, a computer program for implementing the method in the transmission control unit, a vehicle transmission, and a motor vehicle with a vehicle transmission are indicated.

Form the process-technological standpoint this objective is achieved by the features described herein. A transmission control unit designed to carry out the method is also disclosed. Finally, a computer program for implementing the method on such a transmission control unit and a vehicle transmission with such a transmission control unit and a motor vehicle with such a vehicle transmission are disclosed. Advantageous further developments will be apparent in light of the following description and the drawings.

According to the present invention a method is proposed for operating a multi-gear vehicle transmission in a motor vehicle during a coasting phase of the motor vehicle.

The vehicle transmission has a plurality of shifting elements for engaging the gears of the vehicle transmission. The vehicle transmission has at least one neutral gear and at least one driving gear. In the neutral gear the transmission input and the transmission output are decoupled from one another, so that in the neutral gear at least some of the shifting elements of the vehicle transmission can be actuated in order to enable a rapid transition from an engaged neutral gear to a required driving gear. The neutral gear corresponds to idling of the transmission. On the other hand, in the driving gear the transmission input is coupled to the transmission output in order propel the vehicle. This coupling can be brought about by closing the shifting elements associated with the driving gear. A driving gear is understood to be any gear of the vehicle transmission which is intended to propel the vehicle. i.e. forward-driving gears and reverse-driving gears. Thus, the gearshift from the neutral gear to the driving gear is carried out by closing the shifting elements of the vehicle transmission associated with the driving gear. The vehicle transmission is in particular an automatic transmission of planetary design.

The shifting elements of the vehicle transmission can be termed transmission shifting elements and are in the form of clutches and/or brakes. The shifting elements can be designed to be actuated by a pressure medium, for example hydraulically or pneumatically. In particular, the lubricant of the vehicle transmission is used as the pressure medium. Preferably the shifting elements are in the form of frictional shifting elements, such as a disk clutch or a disk brake. The actuation of the shifting elements is preferably controlled by a transmission control unit. Thus, the transmission control unit brings about the situation-related actuation of the shifting elements. The motor vehicle can for example be a passenger car or a utility vehicle such as a truck or an omnibus. The vehicle transmission can also be designed for use in a rail vehicle or an agricultural vehicle.

In the coasting phase the motor vehicle is in an unpowered driving operation phase. In an unpowered driving operation phase an accelerator pedal of the motor vehicle is no longer actuated by the driver of the motor vehicle. During the coasting phase the brake pedal also is not actuated. Thus, a vehicle speed at the end of the coasting phase is lower than a vehicle speed at the beginning of the coasting phase, and in fact the vehicle speed at the end of the coasting phase can be zero. The coasting phase preferably comprises an overrun phase with a driving gear engaged in the vehicle transmission and, following the overrun phase, a freewheeling phase with the neutral gear engaged in the vehicle transmission. Thus, the vehicle speed is lower in the freewheeling phase than in the overrun phase.

In the context of the method according to the invention it is provided that whether or not the motor vehicle is in the overrun phase of the coasting phase, is determined.

During the overrun phase a driving gear is still engaged in the vehicle transmission. A coasting phase only takes place at low vehicle speeds. Accordingly, the driving gear engaged during the overrun phase is in particular a starting gear of the vehicle transmission. The starting gear can for example be the first gear or the second gear of the vehicle transmission.

Whether the motor vehicle is in a coasting phase can be determined with reference to a current accelerator pedal actuation, a currently engaged driving gear, a current vehicle speed and/or a current operating mode of the motor vehicle. In the determination of whether the motor vehicle is in a coasting phase, a condition of the brake pedal can also be taken into account, since during the coasting phase the brake pedal is not actuated by the driver of the motor vehicle.

The coasting phase of the motor vehicle can for example be terminated if the driver of the motor vehicle actuates the accelerator pedal. The unpowered travelling operation phase then ends and the motor vehicle accelerates as a function of the actuation of the accelerator pedal. An actuation of the brake pedal by the driver of the motor vehicle also terminates the coasting phase.

Thus, the overrun phase of the coasting phase of the motor vehicle exists when the accelerator pedal and the brake pedal are not actuated, the currently engaged gear corresponds to a starting gear, a vehicle speed is below a speed limit and the vehicle is operated in an overrun mode. Actuation of the accelerator pedal or the brake pedal can be detected, for example, by corresponding displacement sensors. The speed of the vehicle can be determined, for example, by a tachograph or by a sensor-determined rotation speed of the transmission drive output. Other determination methods not explicitly mentioned here can also be used.

Since the accelerator pedal of the motor vehicle is not actuated during the overrun phase of the coasting phase, during the overrun phase the speed of the vehicle decreases progressively. Then, when in the overrun phase a speed limit value or rotation speed limit value for the freewheeling phase is reached or exceeded, there is normally a transition to the freewheeling phase of the coasting phase, in that the neutral gear is engaged in the vehicle transmission (stand decoupling). In the neutral gear the transmission drive input and the transmission drive output are decoupled from one another and the motor vehicle can coast in a freewheel phase. As the vehicle speed limit value, for example, a limit value can be specified for the vehicle speed, whereas for the rotation speed a limit value for the rotation speed of the drive motor, such as an idling speed, can be specified.

With the neutral gear engaged, shifting elements associated with a selected starting gear can be prepared for the gearshift into the starting gear by already pre-filling or prestressing them. In the case of a transmission condition with elevated drag losses this can have the result that the transmission still transmits some torque and the motor vehicle does not by itself come to rest due to the prevailing driving resistance, as would be usual when freewheeling.

Accordingly, in the context of the method according to the invention, it is further provided to determine whether or not a transmission condition with elevated drag losses exists. A transmission condition with elevated drag losses exists in particular when the vehicle transmission has not yet reached a sufficiently high temperature. If the transmission is cool, the lubricant present in it (usually transmission oil) has relatively high viscosity. The component frictional and splash losses in the treatment are correspondingly high. A shifting element pre-filled or prestressed correctly under normal conditions can under these circumstances still transmit an undesired torque. This transmission condition is therefore in particular equivalent to a "cold" vehicle transmission. For example, the transmission condition can exist when the transmission lubricant is below a certain temperature, such as 40° C.

Whether or not the transmission is in a condition with elevated drag losses, can be determined in any desired way. This takes place in particular with reference to a transmission temperature, especially a temperature of the transmission lubricant (oil temperature). For that purpose, a temperature sensor is preferably provided in the vehicle transmission. Alternatively, or in addition, the determination can be done with reference to a temperature model of the vehicle transmission. Alternatively, or in addition, this can be done with reference to a time that has passed since the starting of a motor of a drive aggregate of the vehicle that is or can be coupled to the vehicle transmission. Further determination methods not explicitly mentioned here can also be used. Preferably, the determined transmission temperature or the time passed is compared with a threshold value. If the transmission temperature or the time passed is below the threshold value, it is assumed from this that the transmission is in a condition with elevated drag losses.

If on the other hand the transmission temperature or the time passed is above the threshold value, it is assumed from this that an operating temperature of the vehicle transmission has been reached or exceeded, and the transmission condition of elevated drag losses does not exist, or no longer so. The transmission is then running hot, whereby the drag losses in the transmission are reduced sufficiently. Then, it is advantageously provided that in the vehicle transmission the neutral gear is engaged. The temperature threshold value is preferably between 30° C. and 50° C. A particularly suitable threshold value for the temperature is between 35° C. and 45° C.

If, in the transmission condition with elevated drag losses, starting from the overrun phase of the coasting phase the driving speed or the output rotation speed of the motor vehicle falls below the corresponding limit value for the freewheeling phase, then according to the invention it is provided that in addition to the shifting elements of a driving gear already closed during the overrun phase, at least one further shifting element of the vehicle transmission is at least partially closed.

Due to the said at least partial closing of at least one further shifting element, the vehicle transmission is internally braced. By virtue of the bracing of the vehicle transmission the motor vehicle is braked. The motor vehicle can preferably be braked to a standstill. When the vehicle is at rest, any undesired rolling condition of the motor vehicle resulting from the elevated drag losses can finally be prevented.

The at least one shifting element which is closed in addition to the shifting elements of the driving gear, can be closed completely or partially. In the partially closed condition a force or torque can still be transmitted by the said shifting element, which can brake the motor vehicle by bracing the vehicle transmission. In the partially closed condition, however, the force or torque transmission via the shifting element is less than in the fully closed condition, in which the vehicle transmission is blocked.

In a preferred embodiment of the invention, a degree of closing of the at least one further shifting element which is at least partially closed in order to brake the motor vehicle, is determined at least as a function of a vehicle mass and/or a topography of a road section being driven on or lying ahead. For example, the further shifting element can be closed to brake the motor vehicle with a greater degree of closing when the motor vehicle is heavily loaded. In that way the loaded motor vehicle, which has a larger mass than an unloaded motor vehicle, can be braked in a controlled manner by the force or torque transmission brought about by the shifting element. If the motor vehicle is on a slightly downward slope, then to brake the motor vehicle the further shifting element can be closed with a greater degree of closing that when the motor vehicle is on level ground. Thus, by adjusting the degree of closing of the shifting element to be closed in order to brake the motor vehicle, a downhill force acting on the motor vehicle can advantageously be taken into account. The steeper the slope or the greater the downhill force acting on the motor vehicle, the farther can the shifting element for braking the motor vehicle be closed. It is also possible to determine the degree of closing of the at least one further shifting element that is at least partially closed for braking the motor vehicle, as a function of a stretch of road ahead until the desired standstill of the vehicle is reached. Thus, the degree of closing of the at least one further shifting element that is at least partially closed for braking the motor vehicle, can be determined in such manner that the motor vehicle comes to rest in a controlled manner, for example before a red traffic-light or a recognized end of a traffic-jam.

In contrast, if the vehicle transmission has already reached its operating temperature so that no transmission condition with elevated drag loses exists, and if during the overrun phase of the coasting phase the driving speed or rotation speed limit value for the freewheeling phase has been reached, then it is provided that in the context of the stand decoupling (NIC function, Neutral Idle Control) the gear engaged is automatically disengaged and the neutral gear of the vehicle transmission is automatically engaged. This automatically interrupts the drive-train. The motor vehicle can then roll in the freewheeling phase of the coasting phase until it comes to a standstill. By reducing the transmission support torque, the internal combustion engine can be operated with reduced consumption while the vehicle is at rest.

The method proposed is controlled by the also proposed transmission control unit. This means that the method is carried out by virtue of the transmission control unit. The transmission control unit proposed is accordingly designed to carry out the method with the steps indicated in each case. For this, the transmission control unit has in particular an input and an output, and computation means. The transmission control unit also comprises for this a storage medium (data memory), in which the special commands required for carrying out the method are stored. The input of the transmission control unit is designed such that the required information can be sent to the transmission control unit, for example the current transmission temperature, the current drive output rotation speed, the current brake signal and/or the current accelerator pedal signal. The output of the transmission control unit is designed to emit the necessary control signals for actuating the shifting elements, for example signals for opening and closing valves of the shifting elements. The computation means carry out the commands stored in the storage medium by processing the incoming information and emitting the corresponding control signals for the shifting elements. The computation means consist in particular of a microprocessor.

A computer program according to the invention is designed to enable a transmission control unit to implement the method according to the invention or a preferred further development thereof, when the computer program is run in the transmission control unit. In this connection the object of the invention also includes a computer-readable medium on which the above-described computer program is stored and from which it can be called up.

BRIEF DESCRIPTION OF THE DRAWINGS

Below, the invention is explained in greater detail with reference to figures, from which preferred embodiments and features of the invention emerge. The figures show.

DETAILED DESCRIPTION

Figures 1, 2:
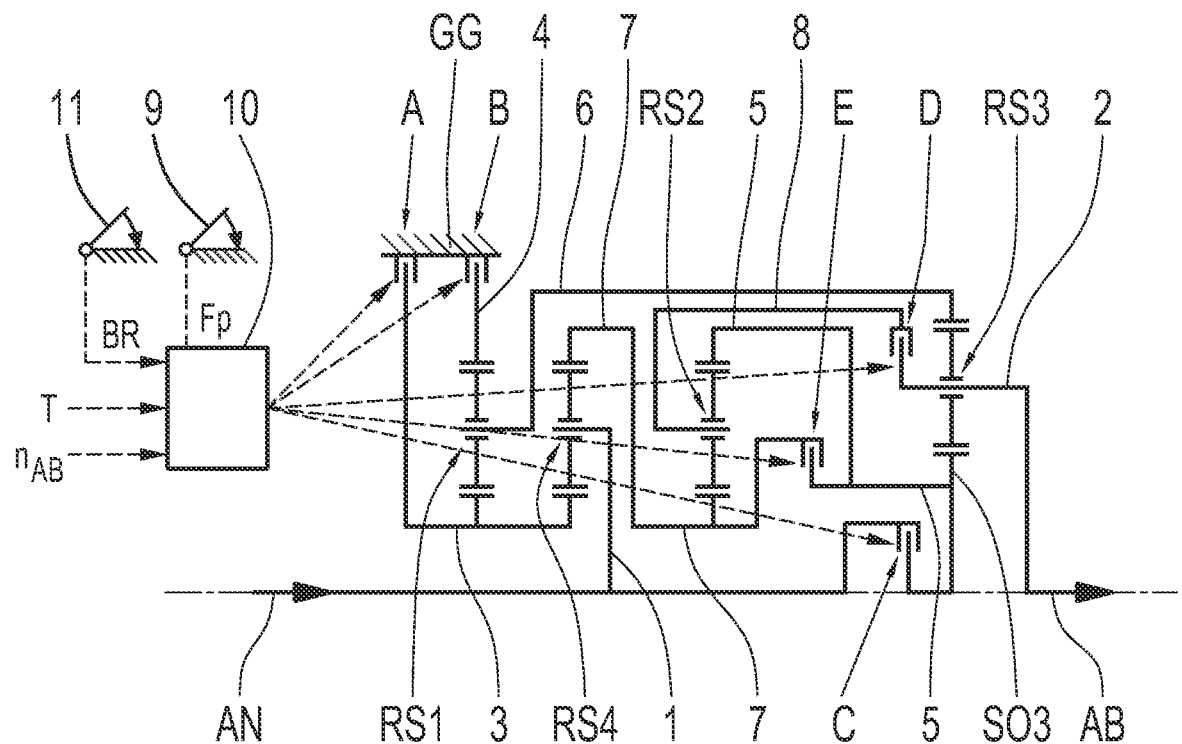
FIG. 1: A schematic representation of an automatic transmission of planetary design.
FIG. 2: An example of a shifting scheme for the automatic transmission of FIG. 1.

In a schematic representation, FIG. 1 shows the arrangement of shafts AN, AB, 1, 2, 3, 4, 5, 6, 7, 8 and planetary gearsets RS1, RS2, RS3, RS4 and shifting elements A, B, C, D, E of a preferred multi-gear vehicle transmission of planetary design. For greater clarity only the upper half of the vehicle transmission is shown. In particular, the lower half is a mirror image structure of this upper half. The drive input shaft AN is usually coupled to a drive motor of the vehicle or can be coupled to it by way of a separate clutch, in particular such as a hydrodynamic torque converter. The hydrodynamic torque converter can comprise a pump wheel, a turbine wheel and a stator. The drive output shaft AB is usually coupled to drive wheels of the vehicle or can be coupled thereto.

In FIG. 1 a transmission control unit 10 is also shown, which serves to actuate the shifting elements A, B, C, D, E of the transmission. Thus, the control unit 10 enables the shifting elements A, B, C, D, E to be selectively opened and closed. In that way the gear appropriate for the situation at the time or called for by a driver of the vehicle can be engaged. For this, appropriate information is fed into the control unit 10 via the input of the control unit. The control unit 10 processes that information and emits appropriate signals for actuating the shifting elements A, B, C, D, E via the output of the control unit.

In particular, the information Fp, Br, T and nAB is sent to the control unit 10. The information Fp is a signal from the accelerator pedal 9 of the motor vehicle, which represents an actuation status of the accelerator pedal. The signal Fp is determined, for example, by a position sensor of the accelerator pedal 9. The information Br is a brake signal of the service brake of the motor vehicle, which represents an actuation status of the brake. Of the service brake, FIG. 1 shows only the brake pedal 11. The brake signal Br is determined, for example, by a position sensor of the brake pedal 11. The information T is a temperature signal that represents the transmission temperature. The temperature signal T is determined, for example, by a temperature sensor of the transmission. The information nAB is a rotation speed signal that represents the rotation speed of the drive output shaft AB.

Usually, the shifting elements A, B, C, D, E are actuated by means of a pressure medium. For that purpose, with each shifting element A, B, C, D, E there is associated an actuating piston which can be acted upon individually by the pressure of the pressure medium. For that purpose the control unit 10 actuates the valves associated with the actuating piston concerned. As the pressure medium, in the transmission shown in FIG. 1 the lubricant of the transmission (transmission oil) is usually used.

The transmission can be shifted to a neutral gear, in which the drive input shaft AN is decoupled from the drive output shaft AB. For this an appropriate number of the shifting elements A, B, C, D, E are opened, specifically the shifting elements C, D, E. On the other hand some of the shifting elements A, B, C, D, E, specifically the shifting elements A and B associated with a starting gear, can already be actuated in the neutral gear in such manner that the shifting element A is preferably closed and the shifting element B preferably pre-filled. The driving gears of the transmission serve to propel the vehicle. In this case, eight forward gears and one reversing gear are available as driving gears. With the transmission shown in FIG. 1, in the driving gears in each case three of the five shifting elements A, B, C, D, E are always closed and the other two shifting elements A, B, C, D, E are open. To carry out a gearshift and thereby to carry out a shifting process, at least one of the previously open shifting elements A, B, C, D, and E of the automatic transmission is closed or engaged and at least one of the previously closed shifting elements A, B, C, D, and E is opened or disengaged.

In the starting gear the vehicle is accelerated from rest or from a very low speed. Accordingly, the starting gear has a relatively high gear ratio. Depending on the loading condition, the starting gear can in particular be the first gear (shifting elements A, B, C closed and D, E open) or the second gear (shifting elements A, B, E closed and C, D open).

FIG. 2 shows an example shifting scheme of the automatic transmission of FIG. 1. In each gear three of the shifting elements A, B, C, D, E are closed and two of the shifting elements A, B, C, D, E are open. The shifting elements are in the form of brakes A, B and clutches C, D, E.

The first forward gear is obtained by closing the brakes A and B and the clutch C, the second forward gear by closing the brakes A and B and the clutch E, the third forward gear by closing the brake B and the clutches C and E, the fourth forward gear by closing the brake B and the clutches D and E, the fifth forward gear by closing the brake B and the clutches C and D, the sixth forward gear by closing the clutches C, D and E, the seventh forward gear by closing the brake A and the clutches C and D and the eighth forward gear by closing the brake A and the clutches D and E. The reversing gear is obtained by closing the brakes A and B and the clutch D.

Below, a preferred procedure for operating the above-described automatic transmission is explained. This procedure is implemented by the transmission control unit 10, which is correspondingly specially designed for the purpose.

In this procedure it is determined whether the motor vehicle is in a coasting phase in which neither the brake pedal 11 nor the accelerator pedal 9 is being actuated by the driver of the motor vehicle. It is also determined whether the motor vehicle is in the overrun phase of the coasting phase. The overrun phase of the coasting phase exists when the accelerator pedal 9 and the brake pedal 11 of the motor vehicle are not actuated, a starting gear is engaged, a vehicle speed is lower than a speed limit and the motor vehicle is being operated in an overrun mode. Actuation of the accelerator pedal 9 or the brake pedal 11 can be detected, for example, by corresponding displacement sensors. The speed of the motor vehicle can be determined, for example, by means of a tachograph or from the rotation speed nAB at the drive output of the transmission, measured by a rotation speed sensor.

In addition, it is determined whether a transmission condition with elevated drag losses exists. The transmission condition with elevated drag losses exists in particular when the vehicle transmission has not yet reached a sufficiently high operating temperature T. This transmission condition is therefore equivalent in particular to a "cold" vehicle transmission. Such a transmission condition can exist, for example, if the temperature of the transmission lubricant is lower than a certain temperature T, such as 40° C. The temperature T of the transmission lubricant can preferably be determined by a temperature sensor.

Since during the overrun phase of the coasting phase the accelerator pedal 9 of the motor vehicle is not actuated, the speed of the vehicle decreases progressively during the overrun phase. When in the overrun phase a driving speed or rotation speed limit value for the freewheeling phase of the coasting phase is reached or exceeded, and a transmission condition with elevated drag losses exists, it is provided that in addition to the shifting elements A, B, C already closed during the overrun phase (first gear) at least one further shifting element D, E of the vehicle transmission is at least partially closed.

In other words, if while the vehicle transmission is still cold the driving speed or rotation speed for the freewheel phase of the coasting phase reaches or falls short of the respective limit value, the neutral gear is not engaged in the transmission (stand decoupling), but rather, a bracing of the transmission is brought about by closing the at least one further shifting element C, D. By bracing the vehicle transmission, the motor vehicle is braked. The motor vehicle can preferably be braked to a standstill. When the vehicle is finally at rest, an undesired rolling condition of the motor vehicle caused by the elevated drag losses can be prevented.

By bracing or blocking the vehicle transmission, since at least one shifting element D, E of the vehicle transmission is closed in addition to the shifting elements A, B, C of the starting gear engaged during the overrun phase of the coasting phase, the turbine wheel of the torque converter is slowed to a low rotation speed. Thereby the torque converter is activated and the vehicle transmission is heated, so that the operating temperature of the vehicle transmission can be reached more rapidly.

The method according to the invention can also be used with other multi-gear vehicle transmissions. For example, the method according to the invention can also be used with automatic transmissions which may be designed, for example, as 5-gear, 6-gear, 7-gear, 9-gear or 10-gear transmissions. The number of gearsets, the number of shifting elements and the number of shifting elements of the vehicle transmission closed in the driving gear can also be different.

Figures 3, 4:
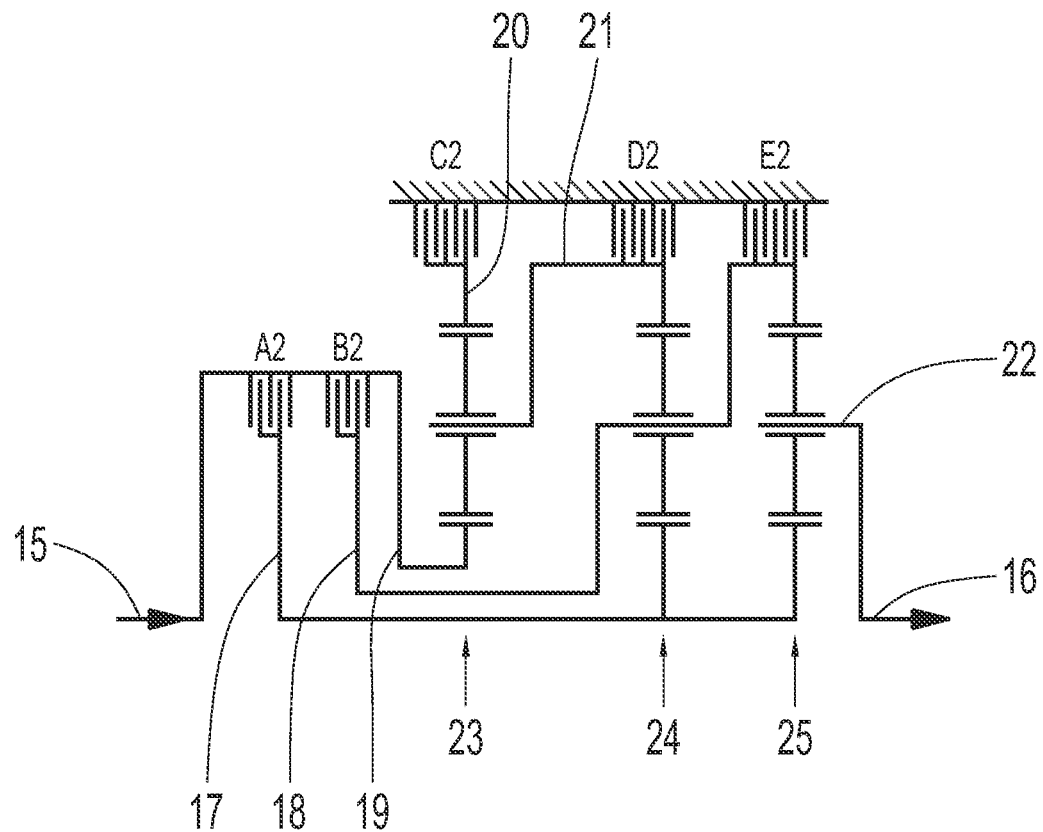
FIG. 3: A schematic representation of a further automatic transmission of planetary design.
FIG. 4: An example of a shifting scheme for the automatic transmission of FIG. 3.

Thus, FIG. 3 shows a second example transmission structure of an example automatic transmission for a motor vehicle, in which the method according to the invention can be used. A drive aggregate (not shown) can be coupled to a transmission input 15 of the automatic transmission and a drive output of the motor vehicle (not shown) can be coupled to a transmission output 16 of the automatic transmission.

The automatic transmission shown in FIG. 3 is of planetary design and has a total of six shafts 17, 18, 19, 20, 21, and 22, wherein the shaft 19 is a transmission input shaft and the shaft 22 is a transmission output shaft. The shafts 17 to 22 of the automatic transmission of FIG. 3 are drive-connected on the one hand by gearsets 23, 24, and 25 and on the other hand by transmission-internal shifting elements A2, B2, C2, D2, and E2. The shifting elements A2, B2, C2, D2, and E2 are actuated by a transmission control unit (not shown here).

The automatic transmission shown in FIG. 3 has three gearsets 23, 24, and 25 and five shifting elements A2, B2, C2, D2, and E2, the shifting elements A2 and B2 being in the form of clutches while the shifting elements C2, D2, and E2 are in the form of brakes. With the automatic transmission shown in FIG. 3 a total of six forward gears and one reversing gear can be engaged, and in each of these gears two shifting elements are closed and three shifting elements are open. To carry out a gearshift and thus a shifting process, at least one of the previously open shifting elements A2, B2, C2, D2, and E2 of the automatic transmission is closed or engaged and at least one of the previously closed shifting elements A2, B2, C2, D2, and E2 is opened or disengaged. The transmission structure shown in FIG. 3 is presented purely as an example. In addition to the frictional shifting elements, interlocking shifting elements can also be present.

FIG. 4 shows an example shifting scheme for the automatic transmission according to FIG. 3. In each gear two of the shifting elements A2, B2, C2, D2, and E2 are closed and three of the shifting elements A2, B2, C2, D2, and E2 are open. The shifting elements are in the form of clutches A2, B2 and brakes C2, D2, and E2.

The first forward gear is obtained by closing the clutch A2 and the brake E2, the second forward gear by closing the clutch A2 and the brake D2, the third forward gear by closing the clutch A2 and the brake C2, the fourth forward gear by closing the clutches A2 and B2, the fifth forward gear by closing the clutch B2 and the brake C2, and the sixth forward gear by closing the clutch B2 and the brake D2. The reversing gear is obtained by closing the brakes C2 and E2.

According to the invention, in this embodiment as well, if a starting gear is engaged in the transmission (such as the first forward gear, with shifting elements A2, E2 closed) and in the overrun phase of the coasting phase a driving speed or rotation speed limit value is reached or exceeded, and if also a transmission condition with elevated rag losses exists, it can be provided that in addition to the shifting elements A2, E2 of the starting gear already closed during the overrun phase (first forward gear) at least one further shifting element B2, C2, D2 of the vehicle transmission is at least partially closed.

Due to the bracing or blocking of the vehicle transmission, in that at least one shifting element B2, C2, D2 of the vehicle transmission is closed in addition to the shifting elements A2, E2 of the starting gear engaged in the overrun phase of the coasting phase, the motor vehicle can be braked to a standstill. When the vehicle is at rest, an undesired rolling condition of the motor vehicle caused by the elevated drag losses can finally be prevented.

INDEXES

1 Shaft
2 Shaft
3 Shaft
4 Shaft
Shaft
6 Shaft
7 Shaft
8 Shaft
9 Accelerator pedal
10 Transmission control unit
11 Brake pedal
15 Transmission input
16 Transmission output
17 Shaft
18 Shaft
19 Shaft
20 Shaft
21 Shaft
22 Shaft
23 Gearset
24 Gearset
25 Gearset
A Shifting element/disk brake
B Shifting element/disk brake
C Shifting element/disk clutch
D Shifting element/disk clutch
E Shifting element/disk clutch
AN Drive input shaft
AB Drive output shaft
GG Housing
RS1 Planetary gearset
RS2 Planetary gearset
RS3 Planetary gearset
RS4 Planetary gearset
SO3 Sun gear
A2 Shifting element/Disk clutch
B2 Shifting element/Disk clutch
C2 Shifting element/Disk brake
D2 Shifting element/Disk brake
E2 Shifting element/Disk brake

The invention claimed is:

1. A method for operating a multi-gear vehicle transmission in a motor vehicle during a coasting phase of the motor vehicle, the method comprising:
    engaging a driving gear during an overrun phase of a coasting phase;
    closing shifting elements of the driving gear during the overrun phase;
    engaging a neutral gear during a freewheeling phase of the coasting phase;
    determining whether the motor vehicle is in the overrun phase of the coasting phase;
    determining whether a condition for a transition to the freewheeling phase of the coasting phase is fulfilled;
    determining whether a transmission condition with elevated drag losses exists; and
    at least partially closing at least one further shifting element if the motor vehicle is in the overrun phase of the coasting phase, the condition for the transition to the freewheeling phase is fulfilled, and a transmission condition with elevated drag losses exists.

2. The method according to claim 1, comprising:
    determining a degree of closing the at least one further shifting element as a function of a vehicle mass and/or as a function of a topography of a road section.

3. The method according to claim 1, wherein the at least one further shifting element is in the form of a disk clutch or a disk brake.

4. The method according to claim 1, comprising:
    closing at least or exactly three of the shifting elements in each driving gear of the vehicle transmission.

5. The method according to claim 1, comprising:
    engaging a neutral gear, if the conditions for the freewheeling phase have been fulfilled, when the motor vehicle is in the overrun phase of the coasting phase and an operating temperature of the vehicle transmission has been reached or exceeded.

6. The method according to claim 1, wherein determining whether the transmission condition with elevated drag losses exists takes into account one or more of (i) a transmission temperature, (ii) an operating duration of the vehicle transmission since starting a motor of a drive aggregate that is or can be coupled to the vehicle transmission, and (iii) a temperature model of the vehicle transmission.

7. A transmission control unit designed to carry out a method according to claim 1.

8. The transmission control unit of claim 7 comprising computer executable code executable by the control unit.

9. A vehicle transmission comprising the transmission control unit according to claim 8.

10. A motor vehicle comprising the vehicle transmission according to claim 9.

* * * * *